United States Patent
Kim et al.

(10) Patent No.: US 7,298,931 B2
(45) Date of Patent: Nov. 20, 2007

(54) IMAGE RETRIEVAL METHOD AND APPARATUS USING ITERATIVE MATCHING

(75) Inventors: Hyun-woo Kim, Kyungki-do (KR); Tae-kyun Kim, Kyungki-do (KR); Won-jun Hwang, Seoul (KR); Seok-cheol Kee, Kyungki-do (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 789 days.

(21) Appl. No.: 10/650,964

(22) Filed: Aug. 29, 2003

(65) Prior Publication Data
US 2004/0073543 A1 Apr. 15, 2004

(30) Foreign Application Priority Data
Oct. 14, 2002 (KR) ............. 10-2002-0062518
Apr. 15, 2003 (KR) ............. 10-2003-0023715

(51) Int. Cl.
*G06K 9/60* (2006.01)

(52) U.S. Cl. ............. 382/305; 382/115; 382/118; 382/190; 340/5.52; 340/5.82

(58) Field of Classification Search ............. 382/209, 382/219, 305, 115, 118, 190, 307; 707/3, 707/6, 7; 340/5.52, 8.82
See application file for complete search history.

(56) References Cited

U.S. PATENT DOCUMENTS

| | | | |
|---|---|---|---|
| 5,586,197 A * | 12/1996 | Tsujimura et al. | 382/162 |
| 6,002,794 A * | 12/1999 | Bonneau et al. | 382/166 |
| 6,246,804 B1 * | 6/2001 | Sato et al. | 382/284 |
| 6,351,749 B1 * | 2/2002 | Brown et al. | 707/10 |
| 6,408,293 B1 * | 6/2002 | Aggarwal et al. | 707/3 |
| 6,421,717 B1 * | 7/2002 | Kloba et al. | 709/219 |
| 6,430,306 B2 * | 8/2002 | Slocum et al. | 382/118 |
| 6,498,863 B1 * | 12/2002 | Gaidoukevitch et al. | 382/173 |
| 6,957,221 B1 * | 10/2005 | Hart et al. | 707/100 |

(Continued)

OTHER PUBLICATIONS

Wey-Shiun Hwang et al., "Hierarchical Discriminant Regression", *IEEE Transactions on Pattern Analysis and Machine Intelligence*, 2000, p. 1277-1293, vol. 22, No. 11, IEEE, New York, New York.

(Continued)

*Primary Examiner*—Yosef Kassa
(74) *Attorney, Agent, or Firm*—Buchanan Ingersoll & Rooney PC (57) ABSTRACT

An image retrieval method and apparatus using iterative matching are provided. The method comprises: (a) extracting K similar images in order of matching rank by retrieving N reference images stored in an image database through comparison between a query image selected by a user and the reference images; and (b) performing iterative matching for M similar images, which are ranked higher and selected from the K similar images, with a predetermined frequency, and rearranging the matching ranks of the M similar images. According to the method and apparatus, among similar images retrieved by using a query image selected by a user, M similar images that are ranked higher are selected, and by performing iterative matching for the M similar images using the high-ranked similar image, M similar images are rearranged in order of similarity and output. Accordingly, accuracy of the matching can improve greatly and a load to the retrieval engine due to iterative retrieval can be minimized.

23 Claims, 6 Drawing Sheets

U.S. PATENT DOCUMENTS 6,985,147 B2 * 1/2006 Asakawa et al. ........... 345/467
7,181,370 B2 * 2/2007 Furem et al. ............... 702/188

OTHER PUBLICATIONS

Christian Breiteneder et al., "*Automatic Query Generation for Content-Based Image Retrieval*", IEEE Conference on Multimedia and Expo, 2000, p. 705-708, vol. 2, IEEE, New York, New York.

Toshio Kamei et al., "*Report of the Core Expresiments on Fourier Spectral PCLDA Based Face Descriptor*", ISO/IEC JTC1/SC29/WGII MPEG 2002/M8559, 2002, p. 1-11.

B.S. Manjunath et al., "*Introduction to MPEG-7: Multimedia Content Description Interface*", A Quantitative Evaluation of Visual Descriptors, 2002, p. 183-184, Section 12.3, John Wiley & Sons.

* cited by examiner

IMAGE RETRIEVAL METHOD AND APPARATUS USING ITERATIVE MATCHING

This application claims priority from Korean Patent Application Nos. 2002-62518, filed on Oct. 14, 2002 and 2003-23715, filed on Apr. 15, 2003, in the Korean Intellectual Property Office, the contents of which are incorporated herein by reference in their entirety.

BACKGROUND OF THE INVENTION

1. Field of the Invention

The present invention relates to a multimedia retrieval system, and more particularly, to an image retrieval method and apparatus using iterative matching in order to improve accuracy of retrieval without overload of retrieval time in a content-based image retrieval system.

2. Description of the Related Art

Recently in the content-based multimedia retrieval trend, the focus has been put on providing a user-friendly interface with overcoming the limitation of keyword retrieval in text-based retrieval. Particularly, the rapid growth of the Internet, personalization of multimedia equipment, and the introduction of digital libraries have been stimulating demands for content-based multimedia retrieval. Meanwhile, the content-based image retrieval includes analyzing image characteristic information such as colors, textures, shapes and faces and arranging images which are visually the more similar to a desired image, in order of visual similarity. Content-based image retrieval comprises a step for extracting characteristics and a step for image matching. In the step for extracting characteristics, predetermined vectors are extracted to describe the characteristics of an image and all images are expressed by respective characteristic vectors and stored in a predetermined database. In the step for image matching, if a query image is given, similarities between the query image and the images in the database are calculated in a characteristic vector domain, and the images in the database are arranged in order of the calculated similarity to the query image.

Many methods related to characteristics extracting and image matching have been under development. For the characteristics extracting among the methods, a variety of characteristic descriptors are being developed particularly in an MPEG-7 category. Meanwhile, for the image matching, methods for reducing a search time and fusion of a plurality of characteristics are mainly being studied. For example, among related research articles, there are "Hierarchical Discriminant Regression," by W. Hwang and J. Weng, IEEE Trans. Pattern Analysis and Machine Intelligence, vol. 22, no. 11, November 2000, pp. 1277-1293, and "Automatic Query Generation for Content-Based Image Retriever," by C. Breitneder and H. Eidenberger, IEEE Conference on Multimedia and Expo, Jul. 30-Aug. 2, 2000, vol. 2, pp. 705-708.

However, though many methods have been tried to reduce a search time or to efficiently fuse a variety of characteristics in the image matching step in the prior art as in the above articles, efforts to improve accuracy of the matching based on knowledge have not been made yet. Accordingly, when an image is retrieved by the above methods, since major characteristic information items of images being determined to be similar are all different, the result is not satisfying sometimes. In addition, even though images have identical contents, changes of illumination or poses can cause different characteristic information items on colors or textures to be stored such that an image may not be retrieved accurately.

To solve these problems, there is a method by which a user feeds information on images similar to a desired image back to a retrieval apparatus by using the result of a first retrieval, so that the retrieval apparatus automatically calculates what is a more important characteristic information item and as a result carries out retrieval again by increasing the weighted value of the important characteristic information item. However, if the retrieval is carried out again, all images stored in an image database used in the first retrieval should be retrieved such that calculation of similarities between the query image and stored images becomes more complicated and if the frequency of iteration increases in order to improve retrieval performance, the burden to the retrieval engine also increases.

SUMMARY OF THE INVENTION

The present invention provides an image retrieval method using iterative matching, by which, among similar images retrieved by using a query image selected by a user, M similar images that are ranked higher are selected, and by performing iterative matching for the M similar images, M similar images are rearranged in order of similarity and output.

The present invention also provides an image retrieval apparatus appropriate to the method using the iterative matching.

According to an aspect of the present invention, there is provided an image retrieval method comprising: (a) extracting K similar images in order of matching rank by retrieving N reference images stored in an image database through comparison between a query image selected by a user and the reference images; and (b) performing iterative matching for M similar images, which are ranked higher and selected from the K similar images, with a predetermined frequency, and rearranging the matching ranks of the M similar images.

In the method, the step (b) comprises: (b1) storing M similar images whose matching ranks are higher among the K similar images extracted in the step (a); (b2) selecting a similar image ranked the highest among the M similar images, as a new query image, and by performing iterative matching for (M−1) similar images except the image ranked the highest, determining a similar image having the second highest rank next to the highest-ranked image; and (b3) after changing the new query image and a retrieval range in the step (b2), performing iterative matching with the predetermined frequency of iteration and rearranging the matching ranks of the M similar images.

According to another aspect of the present invention, there is provided an image retrieval apparatus comprising: a 1st retrieval unit which extracts K similar images in order of matching rank by retrieving N reference images stored in an image database through comparison between a query image selected by a user and the reference images; and a 2nd retrieval unit which performs iterative matching for M similar images, which are ranked higher and selected from the K similar images, with a predetermined frequency, and rearranges the matching ranks of the M similar images.

In the apparatus, the 2nd retrieval unit comprises: a 1st storage unit which stores M similar images whose matching ranks are higher among K similar images provided by the 1st retrieval unit; and an iterative matching unit which selects a similar image ranked the highest among the M similar images stored in the 1st storage unit, as a new query image, performs iterative matching for the similar images, except the image ranked the highest, rearranges the ranks of the M similar images, and stores the rearranged M similar images in the 1st storage unit.

In the apparatus, if M<K, a 2nd storage unit for storing (K−M) similar images except the M similar images stored in the 1st storage unit is further included.

In the apparatus, the 2nd retrieval unit further comprises: a retrieval result combining unit which adds the (K−M) similar images stored in the 2nd storage unit, to the M similar images which are rearranged according to matching ranks by the iterative matching unit and stored in the 1st storage unit, and outputs the result as a retrieval result.

According to still another aspect of the present invention, there is provided a computer readable medium having embodied thereon a computer program for the method.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
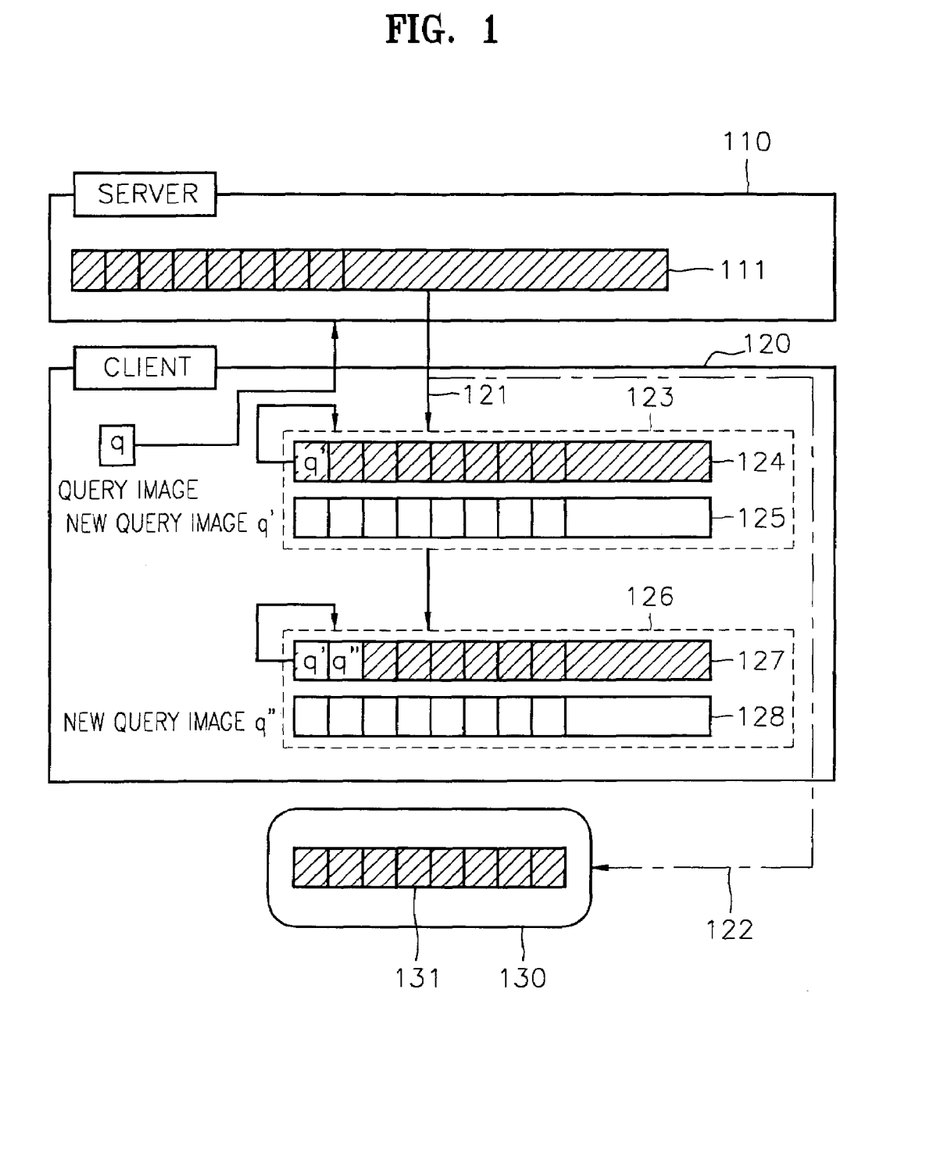
FIG. 1 is a diagram to explain the concept of an image retrieval method according to the present invention.

Referring to FIG. 1, the concept of an image retrieval method according to the present invention comprises a server 110 having an image database and a client 120 which has a buffer 123 or 126 with a predetermined size (M) and requests retrieval of a selected query image. Though the concept comprises the server 110 and the client 120 for convenience of explanation, the concept may also be implemented on a computer and the buffer 123 or 126 may also be installed in the server 110.

Referring to FIG. 1, the server 110 has an image database storing characteristic vectors extracted from N reference images. If a query image is given by the request of the client 120, the server 110 retrieves reference images corresponding to characteristic vectors, by using the characteristic vectors of the query image, and transmits the reference images to the client 120. For convenience of explanation, a characteristic vector that is a mathematical expression of an image for image retrieval will now be referred to as an image.

The client 120 selects a query image q in a retrieval engine (not shown) to be installed in the server 110 and sets predetermined retrieval conditions such as the number (K) of retrieval images. Then, if a request of retrieval is made, the retrieval engine retrieves the image database of the server 110, extracts K similar images 111 in order of matching score and provides the images 111 to the client 120. Among the K extracted similar images, the M similar images 121 ranked higher corresponding to the size (M) of the buffer 123 are stored in the buffer so that each of an image area 124 corresponds to an area in a matching score area 125 in the buffer 123, and the remaining (K−M) similar images 122 are stored in a separate storage medium (not shown).

Then, a retrieval engine (not shown) to be installed in the client 120 selects a similar image q', which is ranked the highest among the M similar images ranked higher stored in the buffer 123, as a new query image and performs iterative matching for the M similar images stored in the buffer 123. By doing so, the retrieval engine extracts the (M−1) similar images, except the highest-ranked similar image q', in order of matching score. The highest-ranked similar image q' and the extracted (M−1) similar images are stored again in the same buffer 126 so that each of an image area 127 corresponds to an area in a matching score area 128. Then, the retrieval engine selects a similar image q", which is ranked the highest among the (M−1) similar images ranked higher stored in the buffer 126, as a new query image and performs iterative matching for the (M−2) similar images stored in the buffer 126. By doing so, the retrieval engine extracts the (M−2) similar images, except the highest-ranked similar image q", in order of matching score.

According to this method, by using a similar image ranked the highest among (M−n+1) similar images, (M−n) similar images are rearranged. Here, n denotes the frequency of iterative matching.

As a final retrieval result 130, M similar images 131 obtained by rearranging M similar images 121, which are originally retrieved, in order of matching score are output. At this time, the (K−M) similar images 122, which are separately stored because the images exceed the size of the buffer 123, 126, may also be output after being added to the M similar images 131 rearranged in order.

Here, though an embodiment in which the server 110 and the client 120 have respective retrieval engines is explained, two retrieval engines may be implemented in a unified retrieval engine installed in the server 110 or in the client 120.

When an image is coded as a characteristic vector for image retrieval, the mathematical expression of the image may include environmental changes, such as changes of illumination or poses, in addition to the characteristic itself of the image. Accordingly, images retrieved by a given query image may reflect coding errors of the query image by the environmental changes, and some images may be retrieved by environmental changes similar to the query image. In general, since most of the similar images ranked highest are usually retrieved by the characteristics of images, it can be known that the similar images ranked highest have the same characteristics as the query image selected by a user and different environmental changes. In the present invention, this similar image ranked highest is set as a new query image.

Figure 2:
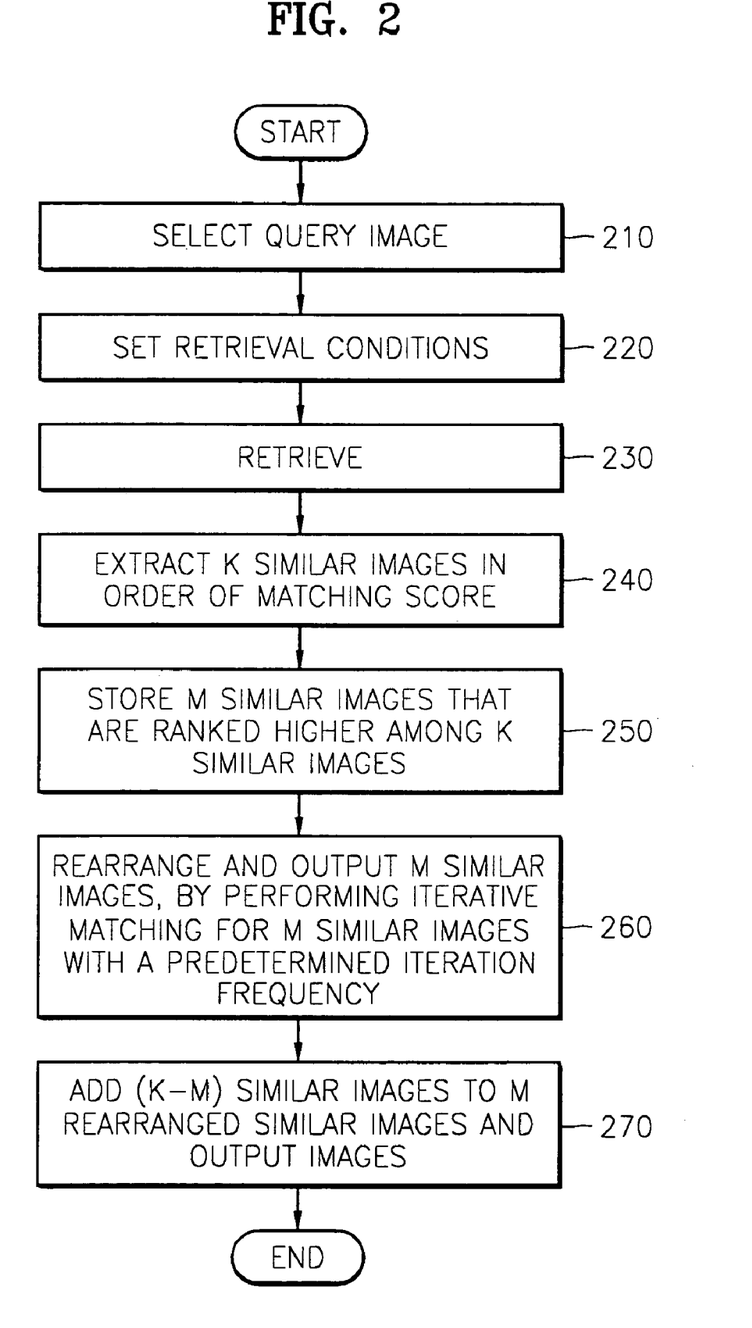
FIG. 2 is a flowchart to explain a preferred embodiment of an image retrieval method according to the present invention.

FIG. 2 is a flowchart to explain a preferred embodiment of an image retrieval method according to the present invention and the method comprises the first retrieval step (steps 210 through 240) and the second retrieval step (steps 250 through 270).

Referring to FIG. 2, in the step 210, a query image (q) selected by a user is input and in the step 220 retrieval conditions which are set by the user are input. Here, the retrieval conditions may include a retrieval field, a maximum number (K) of similar images to be displayed as a result of retrieval, the number of similar images to be used in iterative matching, and the frequency (n) of iteration.

In the step 230, comparison retrieval for the query image (q) input in the step 210 according to the retrieval conditions set in the step 220 is performed with reference images $\{I_i|\ i=1,\ldots,N\}$ of an image database. For this, first, the characteristic information of the query image (q) is extracted, and the extracted characteristic information is compared with characteristic information of reference images indexed in the image database. By doing so, retrieval is performed. In the step 240, according to the retrieval result of the step 230, K similar images are extracted in order of matching score.

In the step 250, among the K similar images extracted in the step 240, M similar images $\{q_i|\ i=1,\ldots,M\}$ ranked higher are extracted and stored in a buffer (not shown). At this time, M matching scores $\{s(i)|\ i=1,\ldots,M\}$ are also stored corresponding to M similar images. The matching score may be calculated, for example, by using $D(q,q_i)$. $D(q,q_i)$ indicates the absolute value of a characteristic information distance between the query image (q) and a similar image $(q_i)$. The less the absolute value of a characteristic information distance is, the higher the image is ranked as an image similar to the query image (q). Meanwhile, the step 250 may further comprise a step for storing (K−M) similar images, obtained by excluding the M similar images $\{q_i|\ i=1,\ldots,M\}$ ranked higher among the K similar images, in a separate storage medium.

In the step 260, iterative matching is performed for the M similar images selected in the step 250, with a predetermined frequency of iteration, and then rearranged M similar images are output.

For this, first, an image $(q_1)$ ranked the highest among the M similar images is selected as a new query image (q') and retrieval is again performed for the (M−1) similar images, except the image $(q_1)$ ranked the highest, in the same manner as in the step 230. Thus, retrieval is again performed not for the entire N reference images stored in the image database, but for the M similar images stored in the buffer, which greatly reduces the complexity of similarity calculation. As a result of the retrieval, rearranged similar images $\{q_i'|\ i=1,\ldots,M\}$ and matching scores $\{s'(i)|\ i=1,\ldots,M\}$ corresponding to respective similar images are obtained. In order to reflect matching by the new query image (q'), a matching score (s'(i)) is updated by the following equation 1:

$$s'(i)=s(i)+w_1\cdot D(q',q_i') \tag{1}$$

Here, $w_1$ is a weighted value constant. The reason why a matching score $D(q',q_i')$ obtained by iterative retrieval is weighted by using the weighted value constant $(w_1)$ is to reduce the impact of an incorrectly retrieved image in the next retrieval, if a similar image ranked the highest among the similar images retrieved by an arbitrary frequency of iterative retrieval is incorrectly retrieved.

If the iterative retrieval is performed n times, as a result of the retrieval, rearranged similar images $\{q_i^{(n-1)}|\ i=1,\ldots,M\}$ and matching scores $\{s^{(n-1)}(i)|\ i=1,\ldots,M\}$ corresponding to respective similar images are obtained and stored again in the buffer. At this time, the matching score $(s^{(n-1)}(i))$ can be expressed by the following equation 2:

$$s^{(n-1)}(i)=s^{(n-2)}(i)+w_{n-1}\cdot D(q^{(n-1)},q_i^{(n-1)}) \tag{2}$$

Here, w is set to between 0.7 and 0.9 and desirably to 0.8. In the equation 2, it is preferable that weighted value parameter $(w_{n-1})$ is $(w_1)^{n-1}$ and $w_1$ is set to w. According to this, the weighted value parameter is decreased exponentially in proportion to the frequency of iteration.

According to the iterative retrieval described above, M similar images rearranged in order and stored in the buffer are output as the result of the retrieval.

In the step 270, if the size of the buffer is smaller than the number of retrieval images requested by the user, that is, if M<K, the (K−M) similar images which exceed the buffer size and are separately stored in the step 250 are added to the end of the rearranged M similar images in the step 260 and output.

Meanwhile, if a similar framework is used, the equation 2 may be modified as the following equation 3:

$$s^{(n-1)}(i)=D(q_i,q)+\ldots+w_{n-1}\cdot D(q_i,q^{(n-1)}) \tag{3}$$

In the equation 3, in the step 240, the matching ranks of a plurality of images ranked higher among the K similar images, which are extracted in order of matching score as the result of retrieval in the step 230, are fixed and then iterative matching can be performed.

Figure 3:
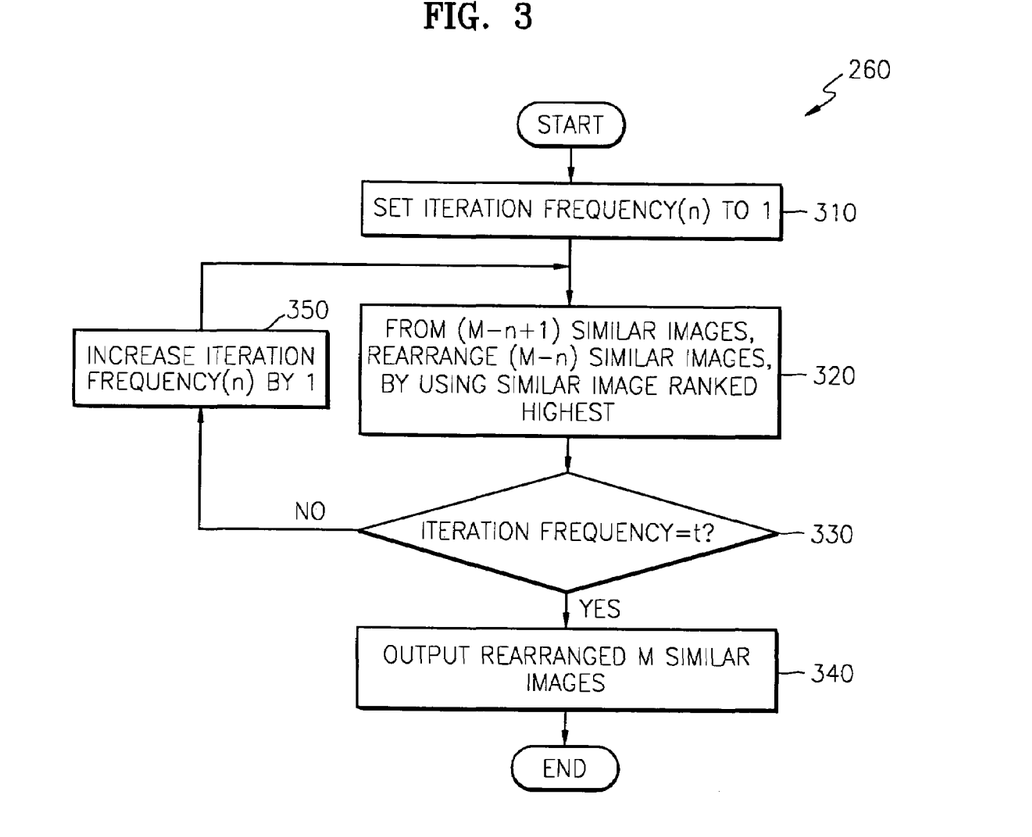
FIG. 3 is a detailed flowchart of step 260 shown in FIG. 2.

FIG. 3 is a detailed flowchart of the step 260 shown in FIG. 2. In step 310, the frequency (n) of iteration is set to 1. In step 320, a similar image ranked the highest among (M−n+1) similar images is set to a new query image and (M−n) similar images are rearranged. That is, when the frequency (n) of iteration is 1, by using a similar image ranked the highest among M similar images, (M−1) similar images can be rearranged.

In step 330, it is determined whether or not the frequency (n) of iteration is the same as the set value (t), and if the frequency (n) of iteration is the same as the set value (t), the step 340 is performed to output rearranged M similar images. Here, the frequency (n) of iteration may be set by the user when the retrieval conditions are set in the step 220. Also, the frequency (n) of iteration may be determined in the retrieval engine according to the number of images whose ranks change compared to the immediately previous ranks, or according to whether or not ranks change after i-th matching ranks. That is, if the number of images whose ranks change is less than a predetermined number P, or if the ranks do not change after i-th matching ranks, the iterative matching is finished.

Meanwhile, if the determination result of the step 330 indicates that the frequency (n) of iteration is less than the set value (t), the step 350 is performed to increase the frequency (n) of iteration, and the step 320 is performed such that with changing a new query image and a retrieval range, iterative matching is again performed.

Figure 4:
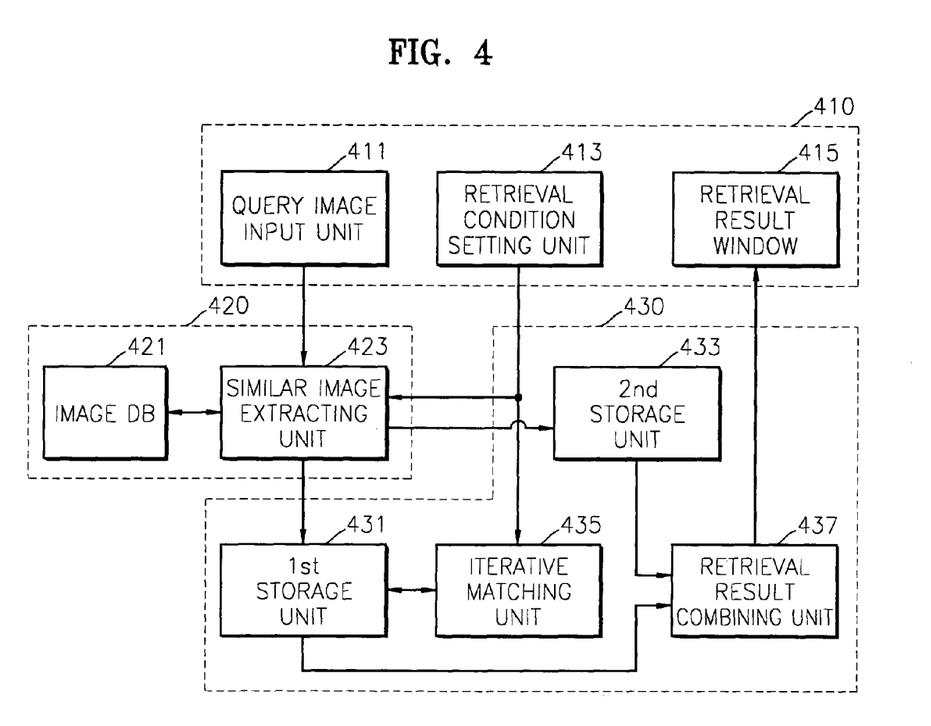
FIG. 4 is a block diagram of the structure of a preferred embodiment of an image retrieval apparatus according to the present invention.

FIG. 4 is a block diagram of the structure of a preferred embodiment of an image retrieval apparatus according to the present invention and the apparatus comprises a user interface unit 410, a 1st retrieval unit 420, and a 2nd retrieval unit 420. In addition, the user interface unit 410 comprises a query image input unit 411, a retrieval condition setting unit 413, and a retrieval result window 415. The 1st retrieval unit 420 comprises an image database 421 and a similar image extracting unit 423, and the 2nd retrieval unit 430 comprises a 1st storage unit 431, a 2nd storage unit 433, an iterative matching unit 435, and a retrieval result combining unit 437.

Referring to FIG. 4, in the user interface unit 410, the query image input unit 411 inputs a query image (q) selected by the user and provides it to the similar image extracting unit 423. Through the retrieval condition setting unit 413, the user sets retrieval conditions, for example, a retrieval field, the maximum number (K) of similar images to be displayed as the result of retrieval, the number (M) of similar images to be used in iterative matching, and the number (n)

of frequency. The retrieval condition setting unit 413 sends the retrieval field, the maximum number (K) of similar images to be displayed as the result of retrieval, and the number (M) of similar images to be used in iterative matching to the similar image extracting unit 423, and the number (n) of frequency to the iterative matching unit 435. The retrieval result window 415 displays similar images finally retrieved according to the present invention.

In the 1st retrieval unit 420, the image database (DB) 421 stores N reference images. The similar image extracting unit 423 performs comparison retrieval between the query image (q) input through the query image input unit 411 and the reference images of the image DB 421 according to the retrieval conditions set in the retrieval condition setting unit 413, and extracts K similar images ranked higher in order of matching score as a result of the retrieval.

In the 2nd retrieval unit 430, the 1st storage unit 431 stores M similar images ranked higher among the K similar images extracted by the similar image extracting unit 423, and the 2nd storage unit 433 stores the remaining (K−M) similar images. The iterative matching unit 435 selects a similar image ranked the highest among the M similar images stored in the 1st storage unit 431, as a new query image, and performs iterative matching for the similar images, except the image ranked the highest. By doing so, the iterative matching unit 435 rearranges the ranks of the M similar images and stores the rearranged similar images in the 1st storage unit 431. The retrieval result combining unit 437 adds the (K−M) similar images stored in the 2nd storage unit 433, to the M similar images which are rearranged according to matching ranks by the iterative matching unit 435 and stored in the 1st storage unit 431, and provides the result to the user interface unit 410.

Next, through an example in which the present invention is applied to face image retrieval, evaluation of the performance of the image retrieval method according to the present invention will now be explained.

Figure 5:
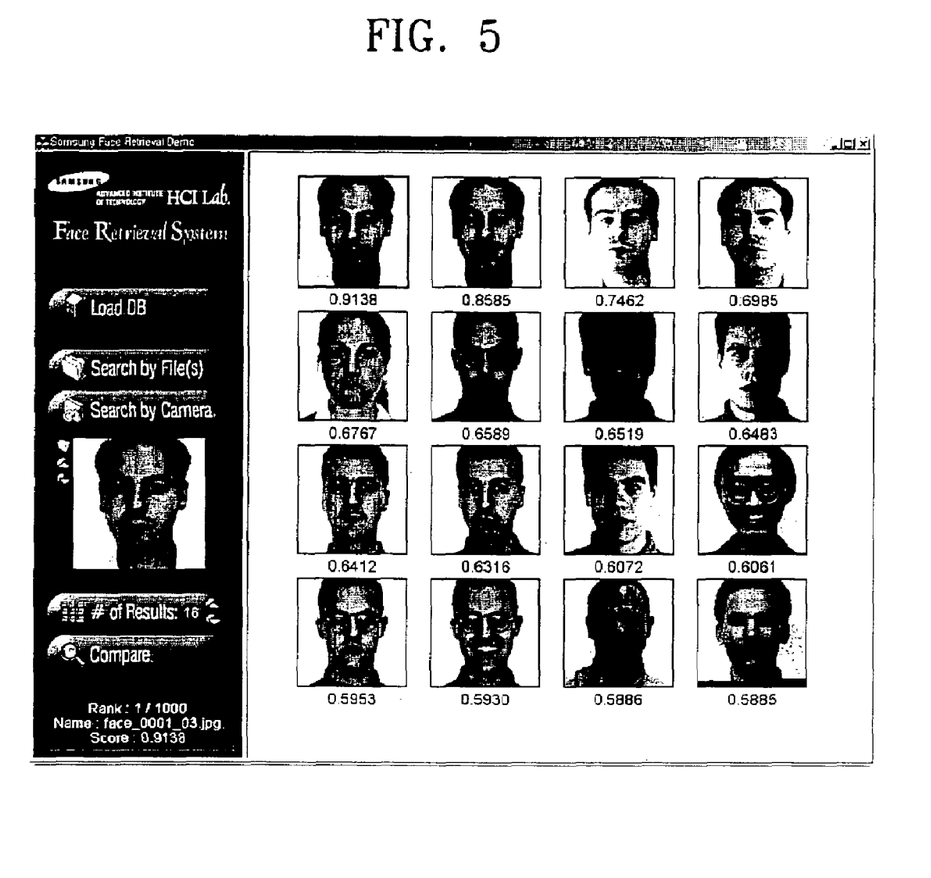
FIG. 5 is an example of a face retrieval system to which the image retrieval method of the present invention is applied to evaluate the performance of the method.

FIG. 5 is an example of a face retrieval system to which the image retrieval method of the present invention is applied, in which 16 similar face images are extracted in order of matching score from a predetermined image database, based on a predetermined face description algorithm, when a query face image is given to the database. For face retrieval, first a face image is expressed by a characteristic vector. To obtain a similarity between two face images, the distance or correlation between the characteristic vectors is calculated. Here, 240 bits are used per each face image as the dimension of a characteristic vector and as a similarity measure, a Euclidian distance between characteristic vectors is used. Meanwhile, characteristic vectors are extracted by using a method proposed in an article, "Report of Core Experiment on Fourier Spectral PCA based Face Description," by Toshio Kamei, Yusuke Takahashi, and Akio Yamada, in NEC_MM_TR_2002_330, July 2002.

Meanwhile, as a data set, an MPEG-7 face data set formed with 5 databases is used. The five databases are an extended version 1 MPEG-7 face database (E1), Altkom database (A2), an MPEG-7 test set (M3) in XM2VTS database, FERET database (F4), and an MPEG-7 test set (B5) in Banca database. The total number of images is 11,845, among which 3655 images are used only as training images for linear discriminant analysis (LDA) projection learning and 8,190 images are used only as test images for evaluating the performance. 4,190 images among the test images are used as query images, and 4,000 images obtained from F4 are used as obstacle images. Table 1 shows a detailed list of training images and test images and it is assumed that in order to evaluate the performance of an image retrieval algorithm according to the present invention, ground truth similar images for all query images are already known.

TABLE 1

|  | DB | Person | Image | Total |
| --- | --- | --- | --- | --- |
| Train | A2 | 40 | 15 | 600 |
| Image I | B5 | — | — | — |
| 50 vs 50 | M1 | 317 | 5 | 1,585 |
|  | M3 | 147 | 10 | 1,470 |
|  | F4 | — | — | — |
| Total |  | 504 |  | 3,655 |
| Test | A2 | 40 | 15 | 600 |
| Image I | B5 | 52 | 10 | 520 |
| 50 vs 50 | M1 | 318 | 5 | 1,590 |
|  | M3 | 148 | 10 | 1,480 |
|  | F4 | — | — | 4,000 |
| Total |  | 558 |  | 8,190 |

Meanwhile, accuracy of retrieval is evaluated in terms of the average normalized modified retrieval rate (ANMRR). The ANMRR evaluates two criteria at the same time: one is the number of retrieved accurate images and the other is the ranks of the accurate images in the retrieval result. The range of the ANMRR is from 0 to 1, and the smaller value indicates a better accuracy. Details of the ANMRR are described in an article, "Introduction to MPEG-7: Multimedia Content Description Interface," by B. S. Manjunath, Philippe Salembier, and Thomas Sikora, John Wiley & Sons Ltd., 2002.

In the experiments, the size (N) of a retrieved data set is 8,190 as shown in the table 1, and the buffer size (M) for iterative matching is 60. When a high-speed sorting algorithm is used, the increased search time for applying the iterative matching is just 0.007 times (=(60 log 60/8190 log 8190)×2) compared to the prior art algorithm. Here, 2 indicates the iteration frequency corresponding to a best accuracy.

Figure 6A:
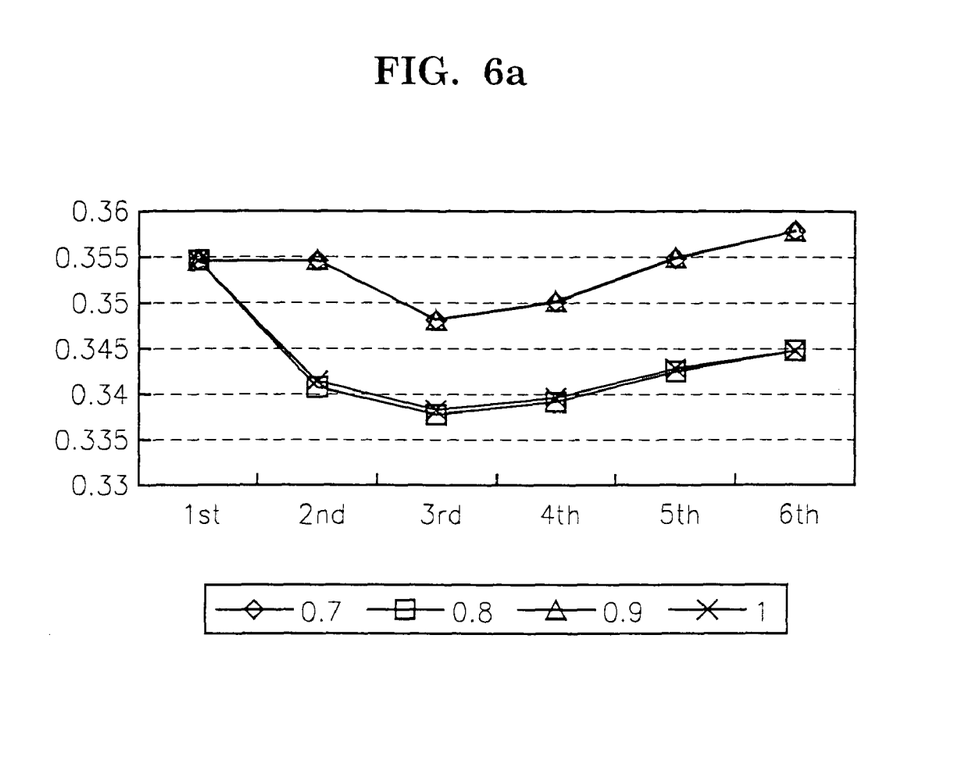
FIGS. 6a and 6b are graphs expressing the accuracies of retrievals by average normalized modified retrieval rates (ANMRR) when experiments were carried out in the face retrieval system shown in FIG. 5.
Figure 6B:
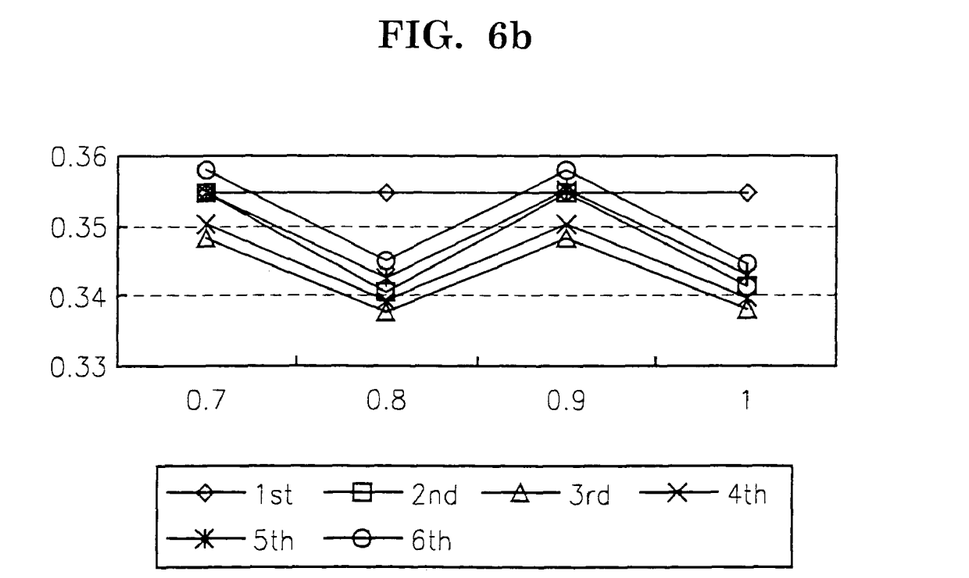

FIGS. 6a and 6b are graphs expressing the accuracies of retrievals in terms of the ANMRR when experiments of the image retrieval method according to the present invention were carried out in the face retrieval system shown in FIG. 5 according to the experiment conditions described above. In FIGS. 6a and 6b, the first retrieval shows the prior art retrieval algorithm to which the iterative matching is not applied. FIG. 6a is a graph showing the accuracy of each retrieval frequency according to the weighted value parameter (w), that is, 0.7, 0.8, 0.9, and 1. The graph shows that irrespective of the weighted value parameters, the third retrieval shows higher accuracies. FIG. 6b is a graph showing the accuracy of each retrieval frequency when the weighted value parameters (w) are 0.7, 0.8, 0.9, and 1. The graph shows that when the weighted value parameters are 0.8 and 1, higher accuracies are obtained. That is, when the weighted value parameter is 0.8 and the frequency of retrieval is 3, that is, the frequency of iteration is 2, the highest accuracy is obtained. In conclusion, the graphs show that compared to the prior art retrieval algorithm, that is, the first retrieval, the performance is improved by 0.0168, from 0.3456 to 0.3378, when expressed by the ANMRR. This means that more images equivalent to 1.7% are retrieved by the iterative matching. The retrieval of the 60-sized buffer and complexity of the calculation needed in the matching for this performance improvement can be neglected when compared to the first matching performed with the 8,190 images in the entire database.

The present invention may be embodied in a code, which can be read by a computer, on a computer readable recording medium. The computer readable recording medium includes all kinds of recording apparatuses on which computer readable data are stored.

The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet). Also, the computer readable recording media can be scattered on computer systems connected through a network and can store and execute a computer readable code in a distributed mode.

According to the present invention as described above, among similar images retrieved by using a query image selected by a user, M similar images that are ranked higher are selected, and by performing iterative matching for the M similar images using the high-ranked similar image, M similar images are rearranged in order of similarity and output. Accordingly, accuracy of the matching can improve greatly and a load to the retrieval engine due to iterative retrieval can be minimized.

Optimum embodiments have been explained above and are shown. However, the present invention is not limited to the preferred embodiment described above, and it is apparent that variations and modifications by those skilled in the art can be effected within the spirit and scope of the present invention defined in the appended claims. Therefore, the scope of the present invention is not determined by the above description but by the accompanying claims.

What is claimed is:

1. An image retrieval method comprising:
   (a) comparing a query image to N reference images stored in an image database and extracting K similar images in order of matching rank from the N reference images; and
   (b) performing iterative matching for M similar images, which are ranked higher among the K similar images, with a predetermined frequency of iteration, by selecting a similar image ranked the highest among to-be-iteratively-matched similar images as a new query image for each iteration, and rearranging the matching ranks of the M similar images for each iteration by updating a matching score using a predetermined weighted value parameter.

2. The method of claim 1, further comprising:
   (c) adding (K−M) similar images, which exclude the M similar images in the K similar images extracted in the step (a), to the M similar images rearranged in the step (b), and outputting the result.

3. The method of claim 1, wherein the step (b) comprises:
   (b1) storing the M similar images whose matching ranks are higher among the K similar images extracted in the step (a);
   (b2) selecting a similar image ranked the highest among the M similar images as a new query image, and performing iterative matching for a retrieval range of (M−1) similar images that excludes the image ranked the highest; and
   (b3) after changing the new query image and the retrieval range in the step (b2), performing iterative matching with the predetermined frequency of iteration and rearranging the matching ranks of the M similar images.

4. The method of claim 3, wherein the step (b) further comprises:
   (b4) storing (K−M) similar images excluding the M similar images in the K similar images extracted in the step (a).

5. The method of claim 4, wherein the step (b) further comprises:
   (b5) adding the (K−M) similar images stored in the step (b4) to the M similar images rearranged in the step (b3) and outputting the result.

6. A computer readable medium having embodied thereon a computer program for executing the method of claim 3.

7. The method of claim 1, wherein the weighted value parameter is a value which decreases exponentially in proportion to the increase of an the iteration frequency.

8. The method of claim 1, wherein the matching score is updated according to the following equation:

$$s^{(n-1)}(i) + W_{n-1} \cdot D(q^{(n-1)}, q_i^{(n-1)})$$

where i is between 1 and M, $s^{(n-1)}(i)$ denotes a matching score corresponding to each similar image $\{q_i^{(n-1)}|i=1,\ldots,M\}$ which are rearranged when iterative matching is performed n times, $w_{n-1}$ is the weighted value parameter which is applied when iterative matching is performed n times, and $D(q^{(n-1)}, q_i^{(n-1)})$ denotes the absolute value of a characteristic information distance between a query image $q^{(n-1)}$ and the rearranged similar images $q_i^{(n-1)}$.

9. The method of claim 8, wherein the weighted value parameter $(w_{n-1})$ is $(w_1)^{n-1}$ and $w_1$ is w.

10. The method of claim 1, wherein the iteration frequency is set by the user.

11. The method of claim 1, wherein the iteration frequency is automatically set according to a number of images whose ranks change in the M similar images compared to an existing previous rank.

12. The method of claim 1, wherein the iteration frequency is automatically set according to whether ranks of the M similar images change after an i-th matching rank.

13. A computer readable medium having embodied thereon a computer program for executing the method of claim 1.

14. An image retrieval apparatus comprising:
   a 1st retrieval unit which compares a query image to N reference images stored in an image database and extracts K similar images in order of matching rank from the N reference images; and
   a 2nd retrieval unit which performs iterative matching for M similar images, which are ranked higher among the K similar images, with a predetermined frequency of iteration, by selecting a similar image ranked the highest among to-be-iteratively-matched similar images as a new query image for each iteration, and rearranges the matching ranks of the M similar images for each iteration by updating a matching score using a predetermined weighted value parameter.

15. The apparatus of claim 14, further comprising:
   a user interface unit which receives the query image and retrieval conditions selected by user the be provided to the 1st retrieval unit and the 2nd retrieval unit, and displays the M similar images rearranged by the 2nd retrieval unit.

16. The apparatus of claim 14, wherein the 2nd retrieval unit comprises:
   a 1st storage unit which stores the M similar images whose matching ranks are higher among the K similar images provided by the 1st retrieval unit; and
   an iterative matching unit which selects a similar image ranked the highest among the M similar images stored in the 1st storage unit as a new query image, performs iterative matching for a retrieval range of (M−1) similar images that excludes the image ranked the highest, rearranges the ranks of the M similar images, and stores the rearranged M similar images in the 1st storage unit.

17. The apparatus of claim 16, wherein the iterative matching unit changes the new query image and the retrieval range each iteration.

18. The apparatus of claim 16, wherein if M<K, the apparatus further includes a 2nd storage unit for storing (K−M) similar images except the M similar images stored in the 1st storage unit.

19. The apparatus of claim 18, wherein the 2nd retrieval unit further comprises:
 a retrieval result combining unit which adds the (K−M) similar images stored in the 2nd storage unit to the M similar images which are rearranged according to matching ranks by the iterative matching unit and stored in the 1st storage unit, and outputs the result as a retrieval result.

20. The apparatus of claim 14, wherein the weighted value parameter is a value which decreases exponentially in proportion to the increase of the iteration frequency.

21. The apparatus of claim 14, wherein the iteration frequency is set by the user.

22. The apparatus of claim 14, wherein the iteration frequency is automatically set according to a number of images whose ranks change in the M similar images compared to an existing previous rank.

23. The apparatus of claim 14, wherein the iteration frequency is automatically set according whether ranks change after an i-th matching rank.

* * * * *